Feb. 25, 1930.  C. F. SMITH  1,748,523
PHOTOGRAPH ENLARGING APPARATUS
Filed Feb. 14, 1927  2 Sheets-Sheet 1

Feb. 25, 1930.  C. F. SMITH  1,748,523
PHOTOGRAPH ENLARGING APPARATUS
Filed Feb. 14, 1927  2 Sheets-Sheet 2

Cyrus F. Smith
Inventor
By C. A. Snow & Co.
Attorneys

Patented Feb. 25, 1930

1,748,523

UNITED STATES PATENT OFFICE

CYRUS FERRIS SMITH, OF COLVILLE, WASHINGTON

PHOTOGRAPH-ENLARGING APPARATUS

Application filed February 14, 1927. Serial No. 168,071.

This invention relates to apparatus designed for making enlargements of photographs. The primary purpose of the invention is to provide a means whereby, during the projection of the enlarged image by the usual means provided for that purpose, a suitable border or other ornamentation placed in close proximity to the negative will be illuminated and photographed on the sensitized material receiving the enlarged image, thereby to produce a tinted or blended border or ornamentation as a part of the enlargement.

A further object is to provide apparatus of this character which is compact and efficient and can be used either with sunlight or artificial light and employed either for projecting the image horizontally or vertically as found most convenient in the studio or other place where the enlargement is being made.

A further object is to provide apparatus by means of which a sharply outlined enlargement of a picture can be produced simultaneously with the production of a diffused enlargement of a border or the like, or vice versa.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings.

Figure 1:
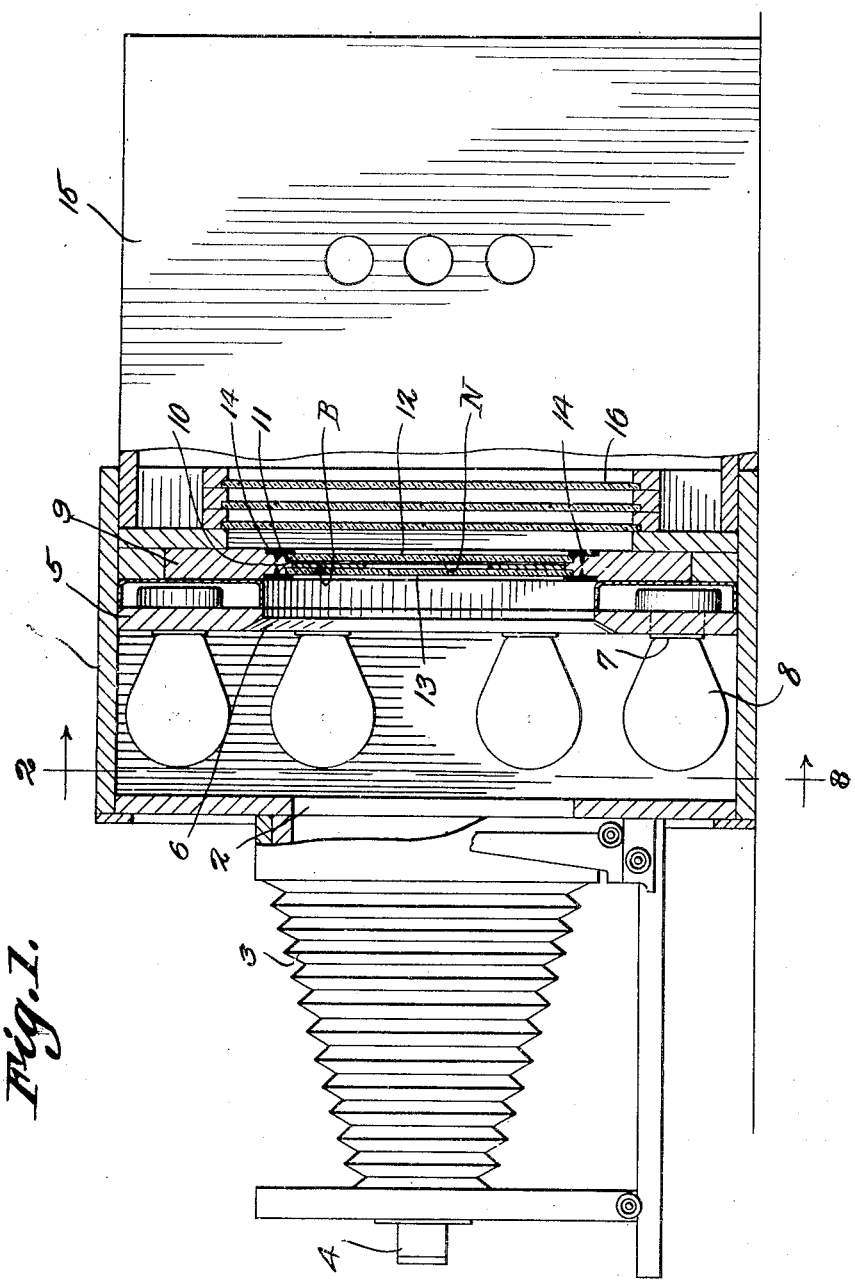
Figure 1 is a view partly in side elevation and partly in section of the apparatus constituting the present invention.
Figure 2:
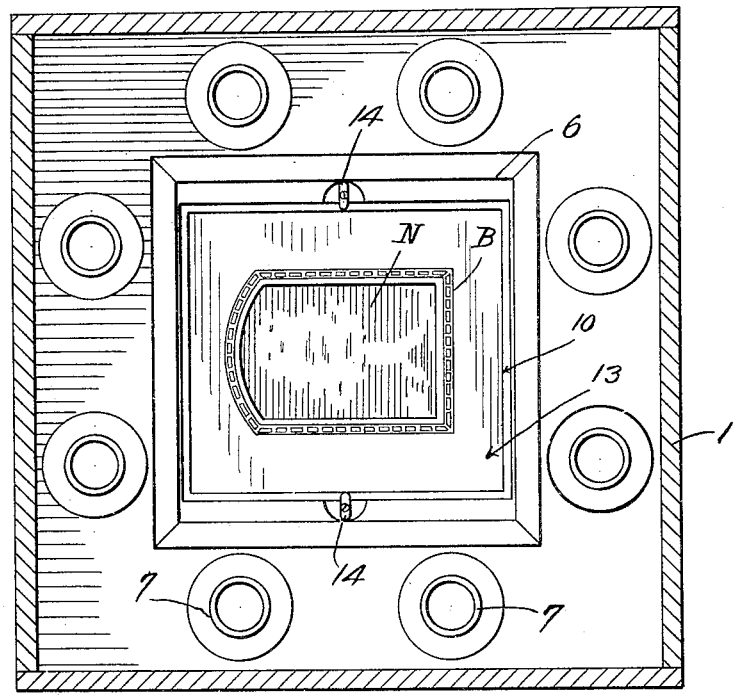
Figure 2 is a section on line 2—2, Figure 1, the lamp bulbs being removed.

Referring to the figures by characters of reference 1 designates a housing the front face of which is provided with an opening 2 about which is fitted a camera 3 the lens tube of which has been indicated at 4. Within the housing 1 is a partition 5 provided with a large central opening 6 and arranged in this partition and around the opening are lamp sockets 7 for receiving incandescent lamp bulbs 8. It is to be understood that the sockets are all properly wired so that one or more of the lamps will be illuminated when desired.

A frame 9 is removably mounted within the housing back of the partition 5 and has a central opening 10 the walls of which are recessed or rabbeted as indicated at 11 so as to receive spaced glass plates or lights 12 and 13 respectively, these being held detachably in place by opposed turn buttons 14. The plates are adapted to receive between them a negative N and a border mat B or the like which will be firmly clamped between the plates 12 and 13.

A light box 15 can be used in connection with the housing 1, this box projecting into the housing against the marginal portion of the frame 9 and being provided with diffusing glasses 16. If preferred, however, the light box 15 can be dispensed with and natural light employed for projecting the image from the negative through the camera to the sensitized material designed to receive the enlarged image. Should the light box be dispensed with the housing 1 would be secured within an opening in a door, wall or the like arranged to receive the rays of natural light.

Figure 3:
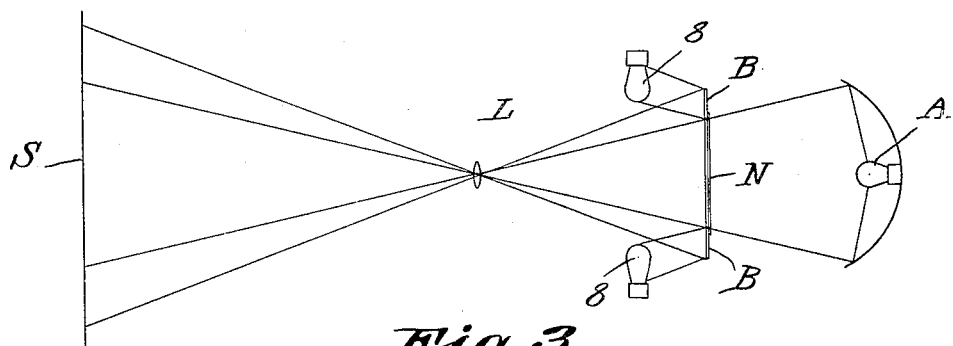
Figure 3 is a view illustrating, in diagram, the projection of the enlarged image and the diffused border about the image.

Assuming that the light box 15 is used for the purpose of producing an enlargement of a photograph, the negative N is placed between the glass plates 12 and 13 and if the photograph is to be provided with a tinted or diffused border, a mat B having the desired border printed thereon is also held between the plates 12 and 13 in proper position relative to the negative. The structure is set up at the desired distance from the sensitized surface S designed to receive the enlarged image and light is projected from the box 15 through the diffusing glasses 16 and the negative N and thence through the camera 3 the lens of which has been shown in diagram at L in Figure 3. The lamp in the light box 15 has been indicated at A in Figure 3. When the lamps 8 are lighted the mat B will be illuminated thereby and this illuminated mat will be photographed by the camera so as to produce an enlarged diffused reproduction of the border about the enlargement on the sensitized material S.

Obviously by regulating the light back of the negative N and within the housing 2 various effects can be produced in the formation of an enlargement. It is even possible to produce a sharp clear-cut enlargement of the border and a diffused enlargement of the picture by varying the exposures to produce the desired result.

If desired the frame 9 can be mounted so as to slide laterally into and out of position within the housing, one or more slots being provided in the wall of said housing to receive the frame. Such a construction is so obvious that detailed illustration thereof is not deemed necessary.

What is claimed is:

1. A device of the class described including a housing, a lens supported outside of the housing for minute adjustment relative thereto, said lens constituting means for projecting an image from within the housing to a sensitized surface outside of the housing, a partition extending across the housing and having an opening, said partition dividing the interior of the housing into separate compartments, a frame removably mounted within the opening, transparent plates carried by the frame constituting means for gripping and holding a negative and a border mat, lamps carried by the partition for directing light rays on to the mat at the lens side thereof, light diffusing means back of the frame, that portion of the housing back of the frame and partition and containing one of the light compartments and the diffusing means being bodily removable from the balance of the housing, thereby to expose the frame for removal.

2. A device of the class described including a housing, a lens supported outside of the housing for minute adjustment relative thereto, said lens constituting means for projecting an image from within the housing to a sensitized surface outside of the housing, a partition extending across the housing having an opening, a frame removably mounted on one side of the partition and in the opening, transparent plates carried by the frame constituting means for gripping and holding a negative and a border mat, lamps carried by the partition and back of the lens for illuminating that surface of the mat nearest the lens, a light box having an opening, light diffusing means extending across the opening, said light box being insertable into the housing for contact with the frame to hold said frame against the partition.

In testimony that I claim the foregoing as my own, I have hereto affixed my signature.

CYRUS FERRIS SMITH.